(12) United States Patent
Barth

(10) Patent No.: US 7,017,873 B2
(45) Date of Patent: Mar. 28, 2006

(54) PORTABLE STAND

(76) Inventor: Roger Barth, Riesseckstr. 5, D-83727 Schliersee (DE)

( * ) Notice: Subject to any disclaimer, the term of this patent is extended or adjusted under 35 U.S.C. 154(b) by 0 days.

(21) Appl. No.: 10/668,118

(22) Filed: Sep. 22, 2003

(65) Prior Publication Data

US 2005/0061933 A1 Mar. 24, 2005

(51) Int. Cl.
*F16M 11/04* (2006.01)
(52) U.S. Cl. ................ 248/187.1; 248/177.1; 396/419; 396/420
(58) Field of Classification Search ............ 248/187.1, 248/178.1, 177.1, 176.1, 444; 396/419, 420, 396/422, 423, 429; 224/908, 584, 265
See application file for complete search history.

(56) References Cited

U.S. PATENT DOCUMENTS

| | | | |
|---|---|---|---|
| 3,289,563 A * | 12/1966 | Kent | ................ 396/422 |
| 5,332,136 A | 7/1994 | Rudolph | |
| 5,839,704 A * | 11/1998 | Appleman | ............ 248/178.1 |
| 6,068,223 A * | 5/2000 | Navarro | .............. 248/187.1 |
| 6,663,298 B1 * | 12/2003 | Haney | ................ 396/419 |
| 2002/0001470 A1 * | 1/2002 | Linnecke | .............. 396/419 |
| 2004/0076421 A1 * | 4/2004 | Linnecke | .............. 396/419 |

OTHER PUBLICATIONS

Magazine Publication Regarding Steadystick Products, Published Feb. 1, 2002.
Magazine Publication Regarding Steadystick Products, Published Nov. 27, 2001.
Magazine Publication Regarding Steadystick Products, Published Jan. 2, 2002.
Magazine Publication Regarding Steadystick Products, Published Mar. 26, 2002.
Magazine Publication Regarding Steadystick Products, Published May 1, 2002.

* cited by examiner

*Primary Examiner*—Amy J. Sterling
(74) *Attorney, Agent, or Firm*—Womble Carlyle Sandridge & Rice, PLLC

(57) ABSTRACT

Portable stand, in particular a portable stand for holding and supporting video cameras, photo-cameras and other optical recording devices, consisting of an oblong basic body; a lower handle mounted to the lower end of the basic body by a first holding element, wherein the lower handle exhibits a fixing hook which engages a pin device of the first holding device and the fixing hook has an at least in parts threaded pin extension for receiving a first forked joint and a fixing screw, wherein the fixing screw is led through a grip surface of the first handle and the first forked joint is pressed onto or released from the first holding element through turning of the grip surface, in such a way that the position of the first handle is adjustable and fixable as desired; an upper handle mounted by a second holding element between the lower and the upper end of the basic body, wherein the upper handle exhibits a fixing hook engaging a pin device of the second holding element and the fixing hook has an at least in parts threaded pin extension for receiving a second forked joint and a fixing screw, wherein the fixing screw is led through a grip surface of the second handle and the second forked joint is pressed onto or released from the second holding element through turning the grip surface, in such a way that the position of the second handle is adjustable and fixable as desired; wherein the first and/or second grip surface of the first and/or second handle is detachable through unscrewing the respective fixing screw; and a connection plate provided at the upper end of the basic body for receiving the device to be carried.

18 Claims, 6 Drawing Sheets

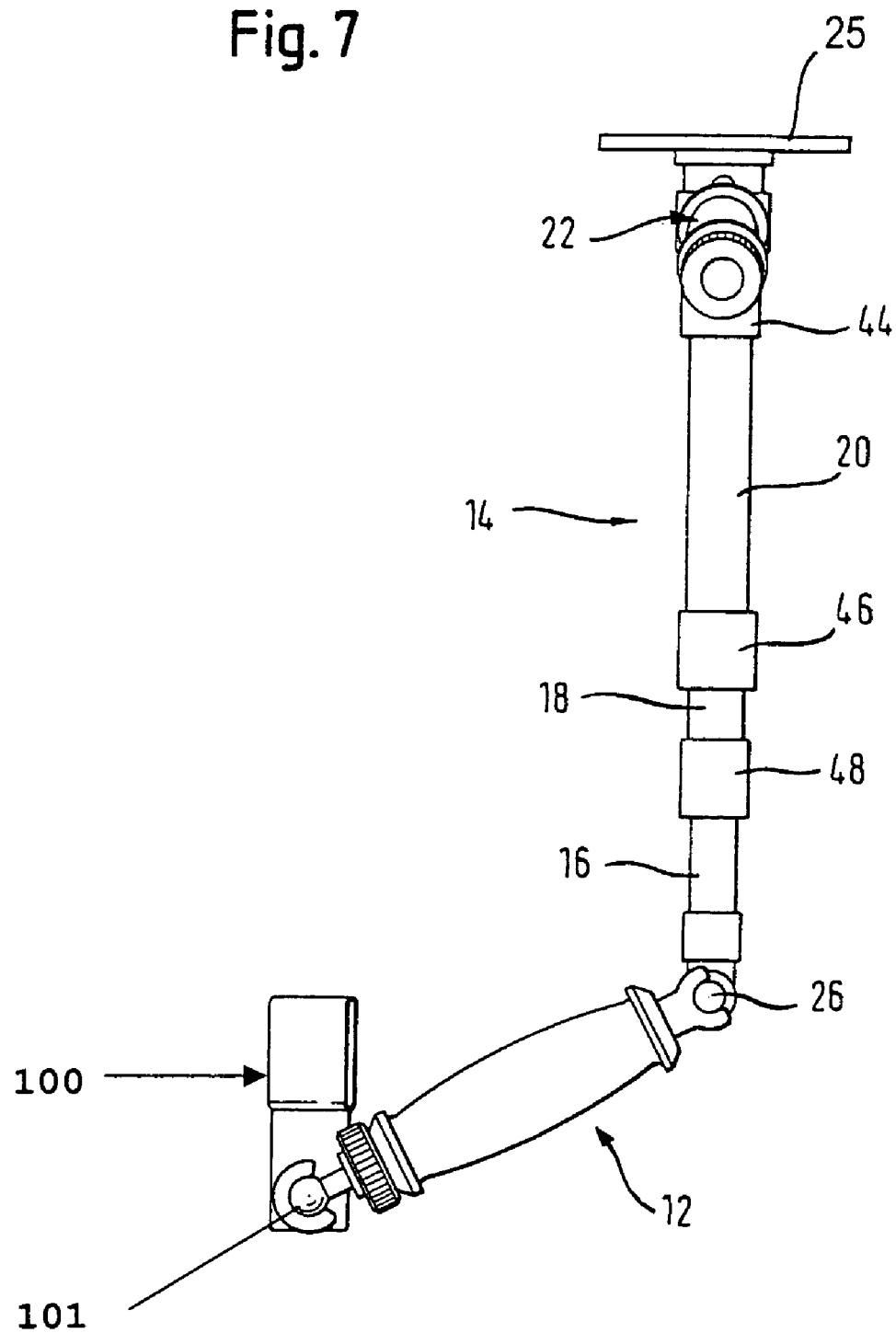

PORTABLE STAND

BACKGROUND OF THE INVENTION

The present invention relates to a portable stand, in particular a portable stand for holding and supporting video cameras, photo-cameras and other optical recording devices, having an oblong basic body and a first lower handle provided at one end of the basic body and a second upper handle as well as a connection plate provided at the opposite end of the basic body for holding the device to be carried.

Portable stands of this kind are known and particularly serve for supporting cameras. For taking photographs as well as for video and film recording it is desirable to achieve as steady and unblurred images as possible, both still and moving. Moreover, it should be possible to move the camera in all axial directions. For this purpose portable stands as known exhibit at least one counter-weight for balancing movements.

A disadvantage of these known portable stands is, however, that the optically conspicuous counter-weight often extends far out, so that it becomes an impediment considerably limiting the freedom to move of the person operating the camera. Due to their heavy total weight such stands can only be carried for a short time, whereby the employment range of these stands is considerably limited.

U.S. Pat. No. 5,839,704 (Appleman) describes a device for supporting a camera or similar device comprising a vertical rod, a camera mounted on top of said rod, a vertically positionable bracket which may be placed along or about said rod, an upper support arm attached to said bracket which can be both vertically and laterally about said rod and having a variable length and pad mounted to its end for bracing against a user, a lower support arm attached to said rod below the upper support arm being adjustable in length and having a lower pad attached to its end for bracing against a user's body so as to provide support and stability when using a camera attached thereto. However, it is a disadvantage of this device that the handles are very hard to operate, i.e. that for each change in the position of the handles the stand needs to be put down, in order to be able to make the necessary changes to the handles. Moreover, the range of employment and use of this known stand is limited.

SUMMARY OF THE INVENTION

It is therefore the object of the present invention to provide a portable stand of the initially mentioned kind which overcomes the afore-described shortcomings of known stands, allows for steady and unblurred images recorded with optical recording devices, facilitates changes in the position of the handles without putting the stand down and exhibits multiple possibilities of use.

A portable stand according to the invention, in particular a portable stand for holding and supporting video cameras, photo-cameras and other optical recording devices, consisting of an oblong basic body; a lower handle mounted to the lower end of the basic body by means of a first holding element, wherein the lower handle has a fixing hook which engages a pin device of the first holding element and the fixing hook has an at least in parts threaded pin extension for receiving a first forked joint and a fixing screw, wherein the fixing screw is led through a grip surface of the first handle and the first forked joint is pressed onto or released from the first holding element through turning the grip surface, in such a way that the position of the first handle is adjustable and fixable as desired; an upper handle positioned between the lower and the upper end of the basic body by means of a second holding element, wherein the upper handle exhibits a fixing hook which engages a pin device of the second holding device and the fixing hook has an at least in parts threaded pin extension for receiving a second forked joint and a fixing screw, wherein the fixing screw is led through a grip surface of the second handle and the second forked joint is pressed onto or released from the second holding device through turning the grip surface, in such a way that the position of the second handle is adjustable and fixable as desired, wherein the first and/or the second grip surface of the first and/or second handle is detachable through unscrewing the respective fixing screw and a connection plate provided at the upper end of the basic body for receiving the device to be carried. p The inventive design of the portable stand allows for releasing, adjusting and fixing the positions of the first and the second handle solely by turning the respective grip surfaces of the handles. It is no longer required to put the stand down. Moreover the detachability of the two handles allows for the present portable stand to be used in a highly versatile way. It is e.g. possible to attach an adapter for a remote control unit for a video camera, a photo-camera or other optical recording devices which are mounted on a portable stand to the pin extension of the fixing hook of the first and/or the second handle. It is also possible to attach further fixing devices for fixing the first and/or the second handle to external elements. These external elements may be e.g. a plug-in belt bow or a base stand. The plug-in belt bow may exhibit a ball-headed link for attachment to the connection device. It guarantees that the stand according to the invention can be carried over a very long period of time, since an optimum balance of the weights of the stand and the device to be carried is given.

Furthermore, it is possible that the pin extension of the fixing hook of the first and/or the second handle serves for receiving and fixing an adapter for a monitor for the video camera, the photo-camera or the other optical recording devices which are mounted on the portable stand. Also other elements which serve a purpose in the employment of video cameras, photo-cameras or other optical recording devices may be attached instead of the first and/or second handle of the portable stand.

In a further advantageous embodiment of the invention the basic body of the portable stand comprises a number of tubular component elements, wherein the basic body may have a telescopic set-up. This allows for extending or shortening the basic body of the stand as required.

In a further advantageous embodiment of the invention the first lower handle is slewable by 90° and the second handle by 180°. This renders it possible for the portable stand to take almost any conceivable position.

In a further advantageous embodiment of the invention the connection plate comprises a snap or bayonet catch for detachably mounting the device to be carried. This guarantees a fast mounting of the device to the stand according to the invention.

BRIEF DESCRIPTION OF THE DRAWINGS

Other objects, advantages, and features of the present invention will become more fully apparent from the following detailed description of the preferred embodiment, the appended claims and the accompanying drawings in which:

FIG. 7 is a view of a portable stand according to the invention, and including a plug-in belt bow.

DETAILED DESCRIPTION OF THE PREFERRED EMBODIMENT

Figure 1:
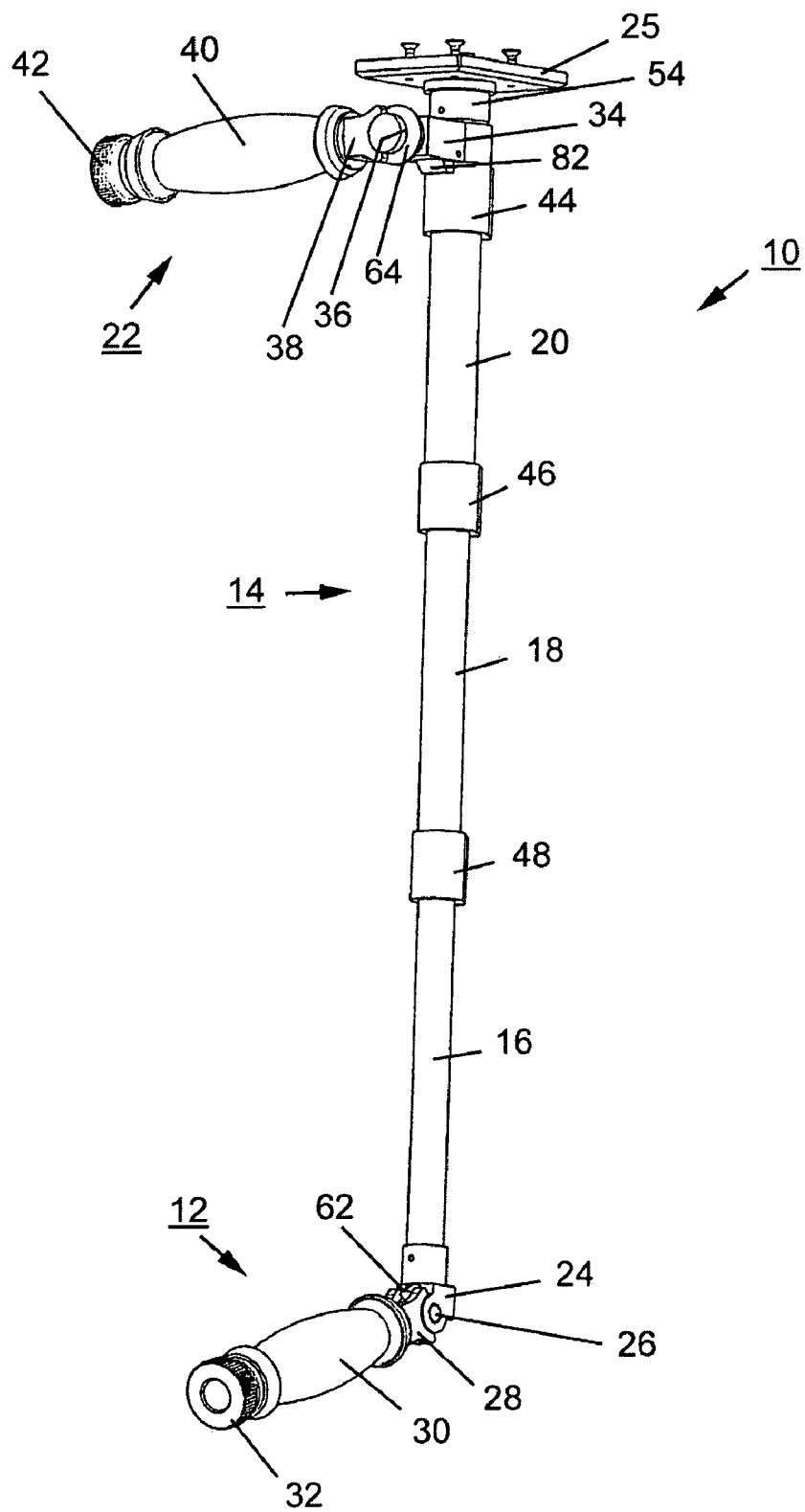
FIG. 1 is a side view of the portable stand according to the invention.

FIG. 1 is a side view of the portable stand 10, wherein the portable stand serves in particular for holding and supporting video cameras, photo-cameras and other optical recording devices. The portable stand 10 consists of an oblong basic body 14, a lower handle 12 mounted to the lower end of the basic body 14 by means of a first holding element 24, wherein the lower handle 12 has a fixing hook 62 which engages a pin device 26 of the first holding element 24. The fixing hook 62 exhibits an at least in parts threaded pin extension 74 for receiving a first forked joint 28 (see in particular FIG. 3). The pin extension 74 moreover serves for receiving a fixing screw 32 which is led through the grip surface 30 of the first handle 12. By turning the grip surface 30 the first forked joint 28 is pressed onto or released from the first holding element 24, in such a way that the position of the first handle 12 is adjustable and fixable as desired. Furthermore, the portable stand 10 has an upper handle 22 provided between the lower end and the upper end of the basic body 14 by means of a second holding element 34. The upper handle 22 equally has a fixing hook 64 which engages a pin device 36 of the second holding element 34 (see also FIG. 2). The fixing hook 64 has an at least in parts threaded pin extension 66 for receiving a second forked joint 38 and a fixing screw 42. The fixing screw 42 is led through the grip surface 40 of the second handle 22. Turning the grip surface 40 causes the second forked joint 38 to be pressed onto or released from the second holding element 34. This renders the position of the second handle 22 adjustable and fixable as desired. Moreover, one can see that the first and/or the second grip surface 30, 40 of the first and/or the second handle 12, 22 is detachable through unscrewing the respective fixing screw 32, 42 (see also FIGS. 2 and 3). The portable stand 10 in addition has a connection plate 25 attached to the upper end of the basic body 14 for receiving the video camera, the photo-camera or the other optical recording devices to be carried.

The basic body 14 in the shown embodiment comprises a number of tubular component elements 16, 18, 20 and is telescopic, wherein the component elements 16, 18, 20 are detachably connected with each other via connecting elements 46, 48. Therein the diameter of the tubular elements 16 and 18 is chosen so as to allow for the component element 16 to be inserted into element 18 and both elements 16, 18 to be inserted into the element 20 (see also FIG. 4). At the upper end of the basic body 14 a fixing sleeve 44 is provided in the area of the second holding element 34 and serves for the second holding element 34 to rest upon. A projecting part 82 provided at the fixing sleeve 44 serves for the holding element 34 to rest upon. The fixing sleeve 44 is slidable so that its position on the basic body 14 or the component element 20 can be changed through sliding.

Figure 2:
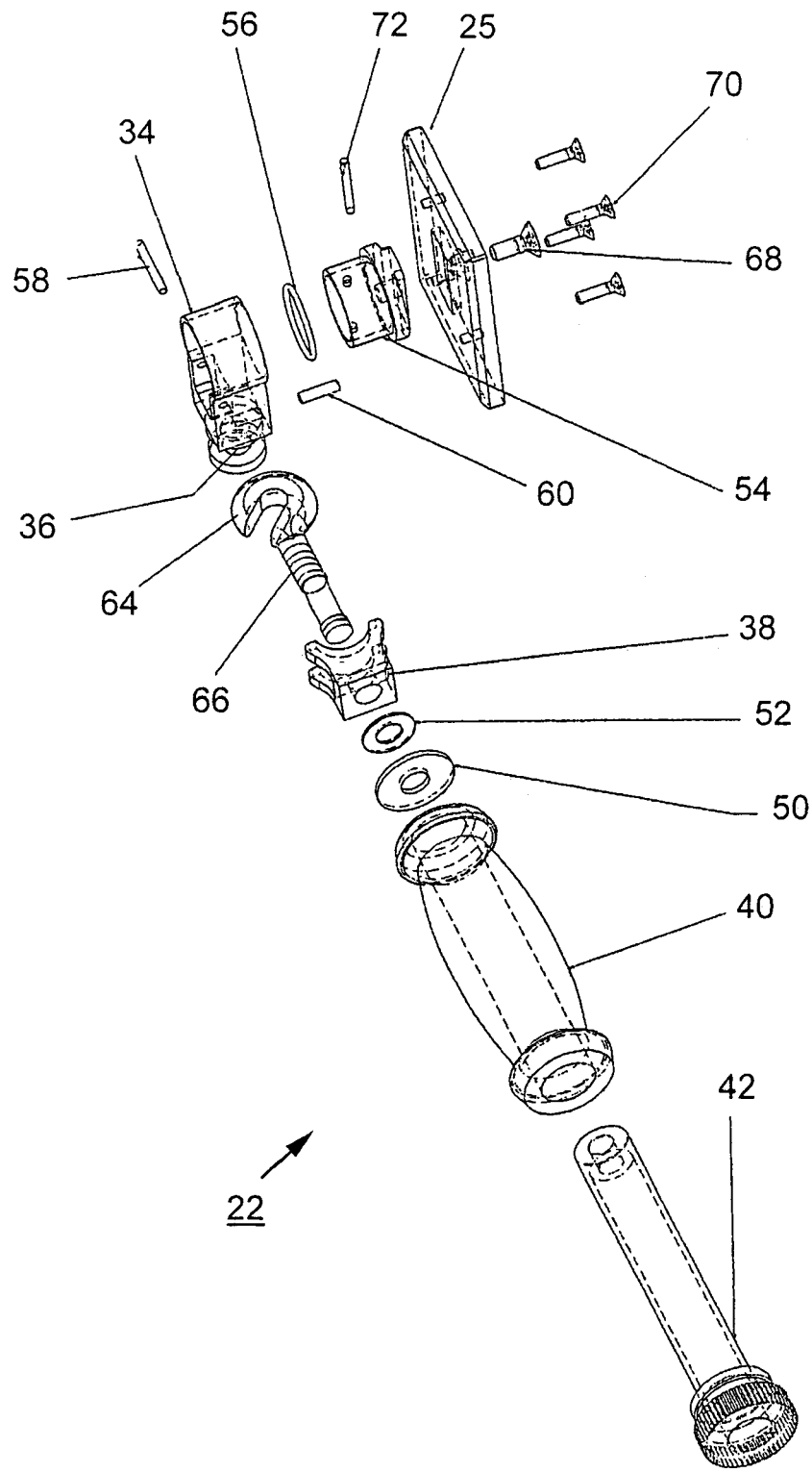
FIG. 2 is an exploded view of the upper handle of the stand according to the invention.

FIG. 2 shows an exploded view of the upper handle 22 of the stand 10. One can see that the second handle 22 is fixed to the holding element 34 and in particular to the pin device 36 of the second holding element 34 by means of the fixing hook 64. For releasing and fixing the second handle 22 to the holding element 34 the second forked joint 38 is pressed onto or released from the second holding element 34 by means of the handle 40 which is connected via the fixing screw 42 with the fixing hook 64 or its pin extension 66. Two collars 50, 52 of different sizes are positioned between the second forked joint 38 and the handle 40.

Moreover one recognizes that a pin 60 which is inserted at the side of the pin device 36 into the holding element 34, contributes to the stabilization of the position of the second handle 22. The holding element 34 is fixed by means of a pin 58 which engages a suitable opening of the projecting part 82 of the fixing sleeve 44, to the latter (see also FIG. 1). The connection plate 25 is attached by means of a screw 68 to a plate holder 54, wherein the plate holder 54 is plugged onto the upper end of the oblong basic body 14 and fixed thereto by means of a pin 72 which is insertable into a suitable opening of the upper end of the basic body 14. A sealing ring 56 is positioned between the plate holder 54 and the second holding element 34. Moreover, at the connection plate 25 connection means 70 are provided which serve for mounting the video camera, the photo-camera or a different optical recording device. It is also possible that the connection plate 25 exhibits a snap or bayonet catch for detachably fastening the device to be carried.

From FIG. 2 it can moreover be gathered that the second upper handle 22 can be swiveled by 180°.

Figure 3:
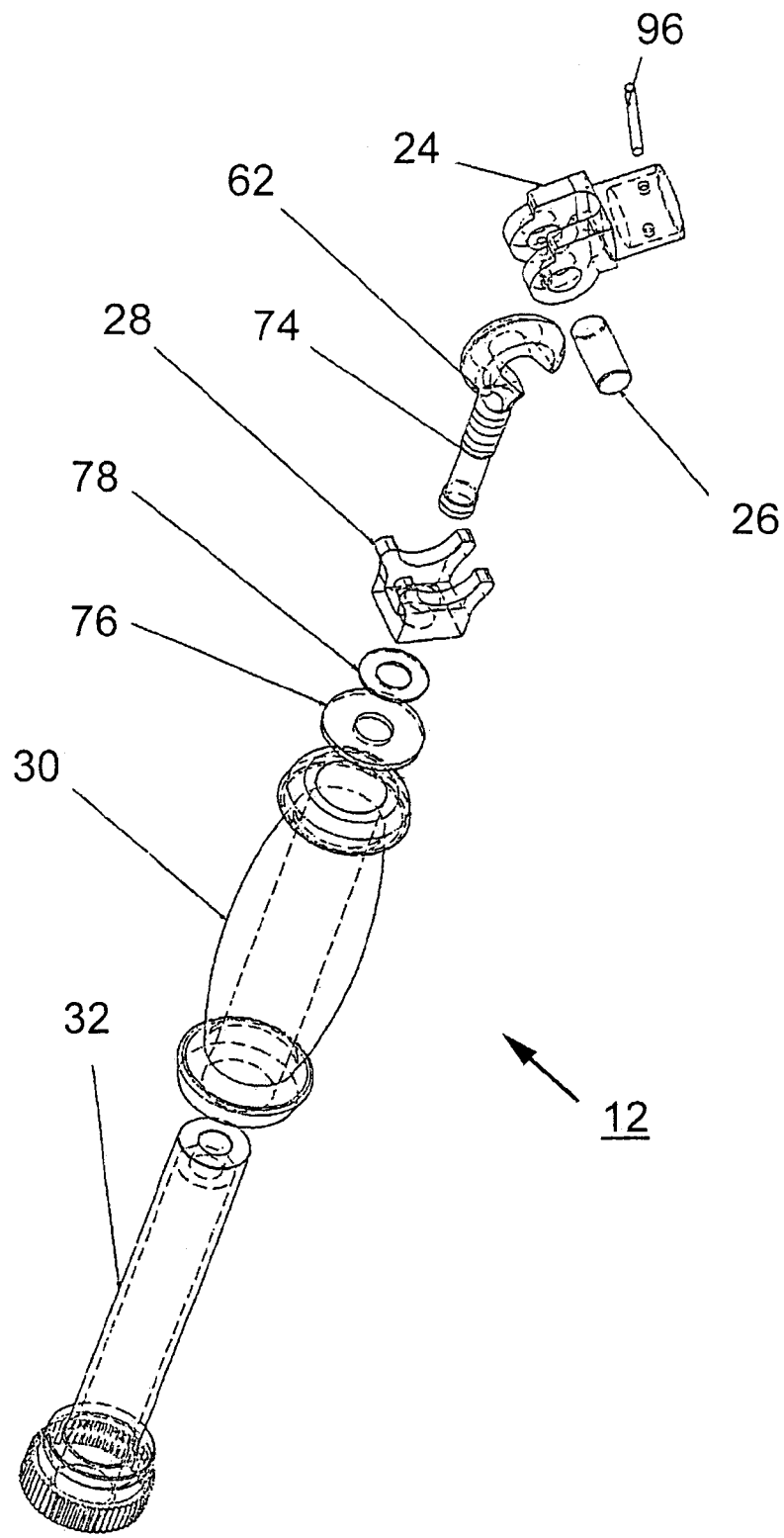
FIG. 3 is an exploded view of the lower handle of the stand according to the invention.

FIG. 3 shows an exploded view of the lower handle 12 of the stand 10. One can recognize again that the lower handle 12 exhibits a fixing hook 62 which engages the pin device 26 of the first holding element 24. Therein the first holding element 24 is plugged onto the lower end of the basic body 14, in particular onto the lower end of the component element 16 and fixed by means of a pin 96 which engages a suitable opening 80 of the component element 16. Moreover, one recognizes that the fixing hook 62 comprises the pin extension 74 with a thread. The first forked joint 28 as well as the fixing screw 32 is screwed onto this thread. Two collars 76, 78 with different diameters are positioned between handle 30 and forked joint 28. Turning the grip surface 30 of the first handle 12 causes the forked joint 28 to be pressed onto or released from the first holding element 24. This renders the position of the first handle 12 adjustable and fixable as desired. One can see that the first lower handle 12 can be swiveled by 90°.

Figure 4:
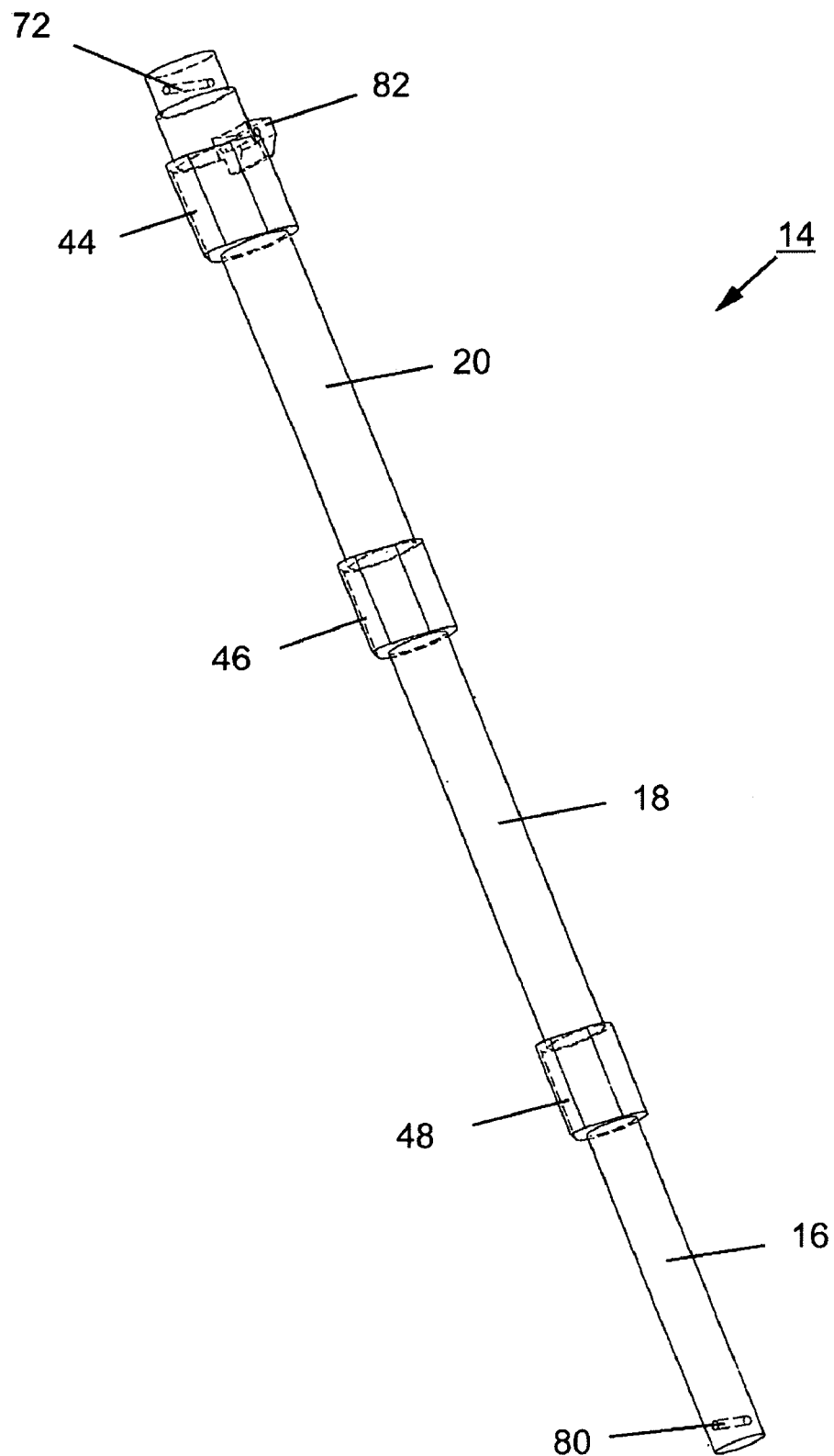
FIG. 4 is a view of the oblong basic body of the stand according to the invention.

FIG. 4 shows a view of the oblong basic body 14 of the stand 10. One recognizes that the basic body 14 comprises three component elements 16, 18, 20, wherein the component elements 16, 18, 20 are connected with each other via two connecting means 46, 48. The upper end of the basic body 14 which faces the connecting plate 25 contains the fixing sleeve 44 with the projecting part 82. Herein the fixing sleeve 44 is slidable on the basic body 14.

FIG. 4 shows a view of the oblong basic body 14 of the stand 10. One recognizes that the basic body 14 comprises three component elements 16, 18, 20, wherein the component elements 16, 18, 20 are connected with each other via two connecting means 46, 48. The upper end of the basic body 14 which faces the connecting plate 24 contains the fixing sleeve 44 with the projecting part 82. Herein the fixing sleeve 44 is slidable on the basic body 14.

Figure 5:
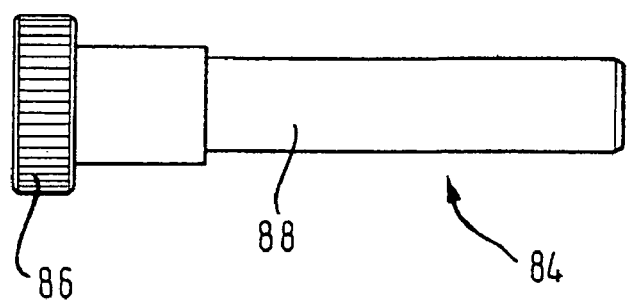
FIG. 5 is a representation of an adapter of the stand according to the invention for a remote control unit for a video camera, a photo-camera or a different optical recording device.

FIG. 5 shows a view of an adapter 84 which can be screwed onto the pin extensions 66, 74 of the fixing hooks 62, 64 of the first and/or the second handle 12, 22. The adapter 84 herein serves for receiving and fixing a remote control unit 90 (see FIG. 6) for the video camera, the photo-camera or the other optical recording devices mounted on the stand. However, it is also possible that instead of the remote control unit 90 a further fixing device serves for fixing the first and/or the second handle 12, 22 to external elements. Herein the external element may be a plug-in belt bow 100 (as shown in FIG. 7) or a base stand (not shown). As described earlier, the plug-in belt bow 100 may exhibit a ball-headed link 101 for connection to the first handle 12. Equally it is possible that the adapter serves for connecting a monitor for the video camera, the photo-camera or the other optical recording devices. One recognizes that the adapter 84 exhibits a grip surface 86 and an oblong basic body 88. The adapter 84 exhibits an internal thread so that it can be screwed onto the pin extensions 66, 74.

Figure 6:
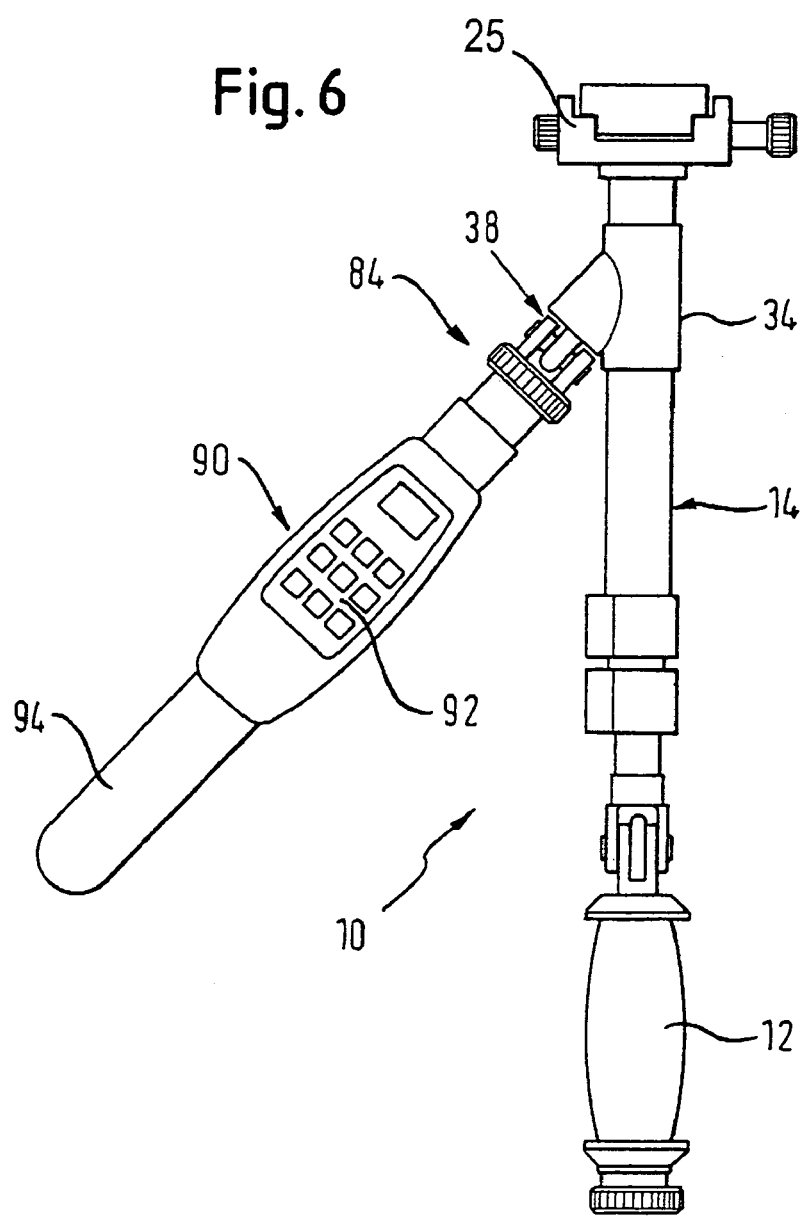
FIG. 6 is a representation of the stand according to the invention with a remote control unit for a video camera, a photo-camera or a different optical recording device.

FIG. 6 shows the stand 10 with a remote control unit 90 for a video camera, a photo-camera or a different optical recording device. One recognizes that the adapter 84 sits on the second forked joint 38 and that the remote control unit 90 is slipped onto the adapter 84 and fixed thereto. Herein the remote control unit 90 comprises an operating surface 92 with corresponding operating elements and a handle 94. The adapter 84 is designed so as to allow for the second forked joint 38 to be pressed onto or released from the second holding element 34 by turning the remote control unit 90 or the adapter 84 connected thereto. This renders it possible also with the remote control unit to easily adjust and fix the position of the handle as desired without putting the stand 10 down.

Although shown in only one embodiment in the figures, it will be recognized from the description set out herein that the present invention contemplates portable stands which, although not constructed exactly as shown in the figures, function in substantially similar fashion to achieve substantially similar results as the portable stand which is shown. All such changes are intended to fall within the spirit and scope of the following claims.

What is claimed is:

1. A portable stand, in particular a portable stand for holding and supporting video cameras, photo-cameras and other optical recording devices, having:
    an oblong basic body having an upper and lower;
    a lower handle mounted to the lower end of the basic body by means of a first holding element, wherein said lower handle exhibits a fixing hook which engages a pin device of said first holding element and said fixing hook exhibits at least in part a threaded pin extension for receiving a first forked joint and a fixing screw, said fixing screw is led through a grip surface of said lower handle and said first forked joint being pressed onto or released from said first holding element through turning of the grip surface, in such a way that the position of said lower handle is adjustable and fixable as desired;
    an upper handle mounted by means of a second holding element between the lower and the upper end of the basic body, wherein said upper handle exhibits a fixing hook engaging a pin device of said second holding element and said fixing hook has at least in part a threaded pin extension for receiving a second forked joint and a fixing screw, wherein said fixing screw is led through a grip surface of said upper second handle and said second forked joint is pressed onto or released from said second holding element through turning said grip surface, in such a way that the position of said upper handle is adjustable and fixable as desired;
    wherein at least one of said grip surface of the at least one of said lower and upper handles is detachable through unscrewing the respective fixing screw; and
    a connection plate provided at the upper end of the basic body for receiving the device to be carried.

2. The portable stand according to claim 1, wherein the pin extension of at least one of said lower and upper handles serves for receiving and fixing an adapter for a remote control unit for the video camera, the photo-camera or the other optical recording devices.

3. The portable stand according to claim 1 wherein said pin extension of said fixing hook of said at least one of said first and lower and upper handles serves for receiving and fixing a further fixing device for fixing said first and/or said second handle to an external element.

4. The portable stand according to claim 3, wherein said external element is a plug-in belt bow.

5. The portable stand according to claim 1, wherein the pin extension of at least one of said lower and upper handles serves for receiving and fixing an adapter for a monitor for the video camera, the photo-camera or the other optical recording device.

6. The portable stand according to claim 1, wherein the basic body comprises a number of tubular component elements.

7. The portable stand according to claim 1, wherein said basic body has a telescopic set-up.

8. The portable stand according to claim 1, wherein said lower handle can be swiveled by 90°.

9. The portable stand according to claim 1, wherein said upper handle can be swiveled by 180°.

10. A portable camera support comprising:
    a basic body to which are attached a connection plate, an upper handle and a lower handle, said upper handle being attached to said basic body by a first holding element and said lower handle being attached to said basic body by a second holding element, each said holding element including a pin device, and each said handle including a fixing hook with a threaded extension, a forked joint, a fixing screw and a grip surface on said fixing screw, said fixing screw releasably pressing said forked joint against said holding element;
    wherein at least one of said handles is detachable through unscrewing the respective fixing screw.

11. The portable stand according to claim 10, wherein said threaded extension of at least one of said lower and upper handles serves for receiving and fixing an adapter for a remote control unit for the video camera, the photo-camera or the other optical recording devices.

12. The portable stand according to claim 10, wherein said threaded extension of at least one of said lower and upper serves for receiving and fixing a further fixing device for fixing said first and/or said second handle to external elements.

13. The portable stand according to claim 12, wherein said external element is a plug-in belt bow.

14. The portable stand according to claim 10, wherein said threaded extension of said fixing hook of at least one of said lower and upper handles serves for receiving and fixing an adapter for a monitor for the video camera, the photo-camera or the other optical recording device.

15. The portable stand according to claim 10, wherein the basic body comprises a number of tubular component elements.

16. The portable stand according to claim 10, wherein said basic body has a telescopic set-up.

17. The portable stand according to claim 10, wherein said lower handle can be swiveled by 90°.

18. The portable stand according to claim 10, wherein said upper handle can be swiveled by 180°.

* * * * *